United States Patent
Meilak

(10) Patent No.: US 12,528,529 B2
(45) Date of Patent: Jan. 20, 2026

(54) CLAMPING DOOR DOLLY

(71) Applicant: Joe Meilak, Moonee Ponds (AU)

(72) Inventor: Joe Meilak, Moonee Ponds (AU)

( * ) Notice: Subject to any disclaimer, the term of this patent is extended or adjusted under 35 U.S.C. 154(b) by 337 days.

(21) Appl. No.: 18/195,778

(22) Filed: May 10, 2023

(65) Prior Publication Data
US 2024/0375696 A1  Nov. 14, 2024

(51) Int. Cl.
*B62B 1/26* (2006.01)
*B62B 1/00* (2006.01)
*B62B 5/00* (2006.01)

(52) U.S. Cl.
CPC .............. *B62B 1/268* (2013.01); *B62B 1/008* (2013.01); *B62B 5/0083* (2013.01); *B62B 2203/44* (2013.01)

(58) Field of Classification Search
CPC  B62B 1/268; B62B 1/008; B62B 1/06; B62B 1/14; B62B 1/142; B62B 5/0083; B62B 5/049; B62B 5/04; B62B 2203/44; B62B 2203/13; B62B 2203/02; B62B 2203/60
USPC ........................................................ 280/79.7
See application file for complete search history.

(56) References Cited

U.S. PATENT DOCUMENTS

| | | | | |
|---|---|---|---|---|
| 1,042,877 A | * | 10/1912 | Blair ........................ | B62H 1/00 280/302 |
| 1,103,486 A | * | 7/1914 | Cobb ....................... | B62B 1/268 280/47.131 |
| 2,967,627 A | | 1/1961 | Vinson | |
| 3,217,839 A | * | 11/1965 | Watkins ................... | B62B 5/049 188/4 R |
| 3,717,357 A | * | 2/1973 | Schaefer ............... | B62B 5/0083 280/47.131 |
| 3,845,969 A | | 11/1974 | Nadeau | |
| 4,043,536 A | | 8/1977 | Almond | |
| 4,270,741 A | * | 6/1981 | Hurst ........................ | B25B 5/04 269/33 |
| 4,695,067 A | * | 9/1987 | Willey .................... | B62B 1/268 269/254 R |
| 5,288,090 A | | 2/1994 | Bross | |
| 5,318,316 A | * | 6/1994 | Shurtleff .................... | B62B 1/10 269/157 |
| 5,507,509 A | * | 4/1996 | Della, Jr. ................... | B62B 3/04 269/133 |
| 6,663,123 B1 | * | 12/2003 | Kovacs ................. | B62B 5/0083 280/47.131 |
| 8,162,329 B1 | * | 4/2012 | Openshaw .............. | B62B 1/268 280/47.131 |
| 2007/0020071 A1 | | 1/2007 | Williams | |

(Continued)

FOREIGN PATENT DOCUMENTS

| | | | | |
|---|---|---|---|---|
| CA | 2109538 | | 5/1995 | |
| CA | 2582080 A1 | * | 9/2008 | ............... B65G 7/04 |

(Continued)

*Primary Examiner* — Steve Clemmons

(57) ABSTRACT

A dolly apparatus for clamping a door to a wheeled base for transportation of the door includes a base and a clamping linkage mounted on the base. The door is positionable on an upper surface of an actuator of the clamping linkage so that a weight of the door urges the actuator to move a pair of jaws of the clamping linkage toward each other above the actuator, thereby clamping the door. A pair of wheels are rotatably mounted to the base.

13 Claims, 9 Drawing Sheets

(56) References Cited

U.S. PATENT DOCUMENTS

| | | | | |
|---|---|---|---|---|
| 2007/0114100 A1* | 5/2007 | Johndreau | ............... | B62B 5/049 188/19 |
| 2011/0095498 A1* | 4/2011 | Morisset | ............... | B62B 5/0083 280/79.7 |
| 2014/0015211 A1* | 1/2014 | Whitefield | ............... | B62B 1/268 280/79.7 |

FOREIGN PATENT DOCUMENTS

| | | | | |
|---|---|---|---|---|
| CN | 111152821 A | * | 5/2020 | ............... B62B 5/06 |
| DE | 20205556 U1 | * | 6/2002 | ............. B62B 1/268 |
| DE | 202004018674 U1 | * | 2/2005 | ............. B62B 1/268 |
| EP | 1524169 A1 | * | 4/2005 | ............. B62B 1/142 |
| FR | 2585655 A1 | * | 2/1987 | ............... B62B 1/26 |

\* cited by examiner

CLAMPING DOOR DOLLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to door dollies and more particularly pertains to a new door dolly for clamping a door to a wheeled base for transportation of the door.

(2) Description of Related Art Including Information Disclosed Under 37 CFR 1.97 and 1.98

Myriad examples of door dollies are disclosed in the prior art, including devices which support a door via an edge of the door and devices which have clamping elements to secure the door to the dolly. However, the prior art fails to describe a dolly which has a clamp linkage that is actuated to clamp the door when the edge of the door is placed in abutment with an upper surface of an actuator of the clamp linkage and a weight of the door acts on the actuator. Such a device would benefit a user wanting to move the door by eliminating steps and effort in clamping the door to the dolly.

BRIEF SUMMARY OF THE INVENTION

An embodiment of the disclosure meets the needs presented above by generally comprising a base and a clamping linkage mounted on the base. The clamping linkage comprises a pair of jaws and an actuator. The actuator has an upper surface configured to support a door, and the pair of jaws is operatively coupled to the actuator such that the pair of jaws move toward each other above the actuator when the actuator moves downwardly. The actuator is configured to move downwardly when a weight force is exerted by the door on the upper surface of the actuator. The clamping linkage is configured to clamp the door between the pair of jaws when the weight force is exerted by the door on the upper surface of the actuator. A pair of wheels each is rotatably mounted to the base. The wheels of the pair of wheels are positioned on opposite ends of the base.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
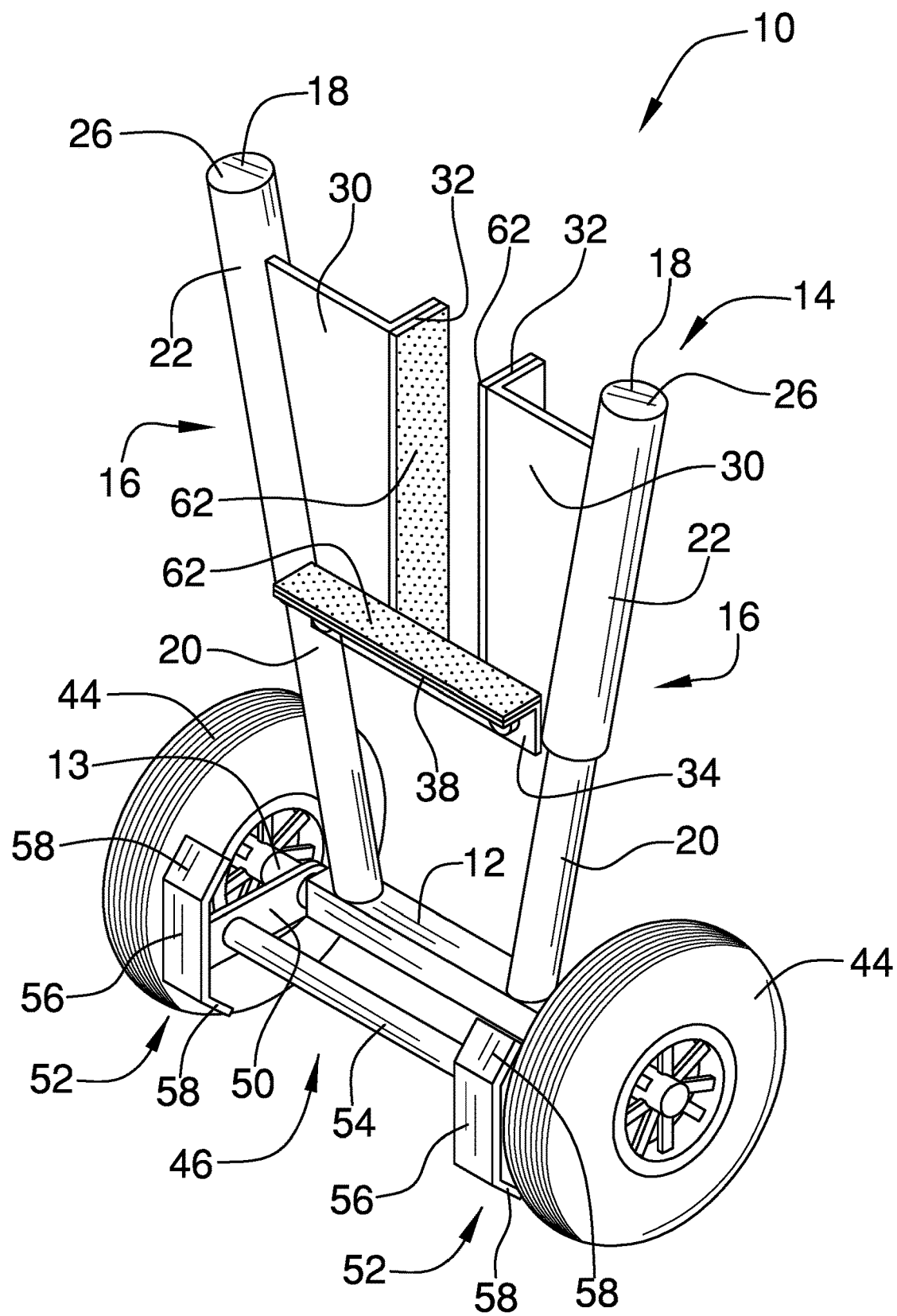
FIG. 1 is a top front side perspective view of a dolly apparatus according to an embodiment of the disclosure.
Figure 2:
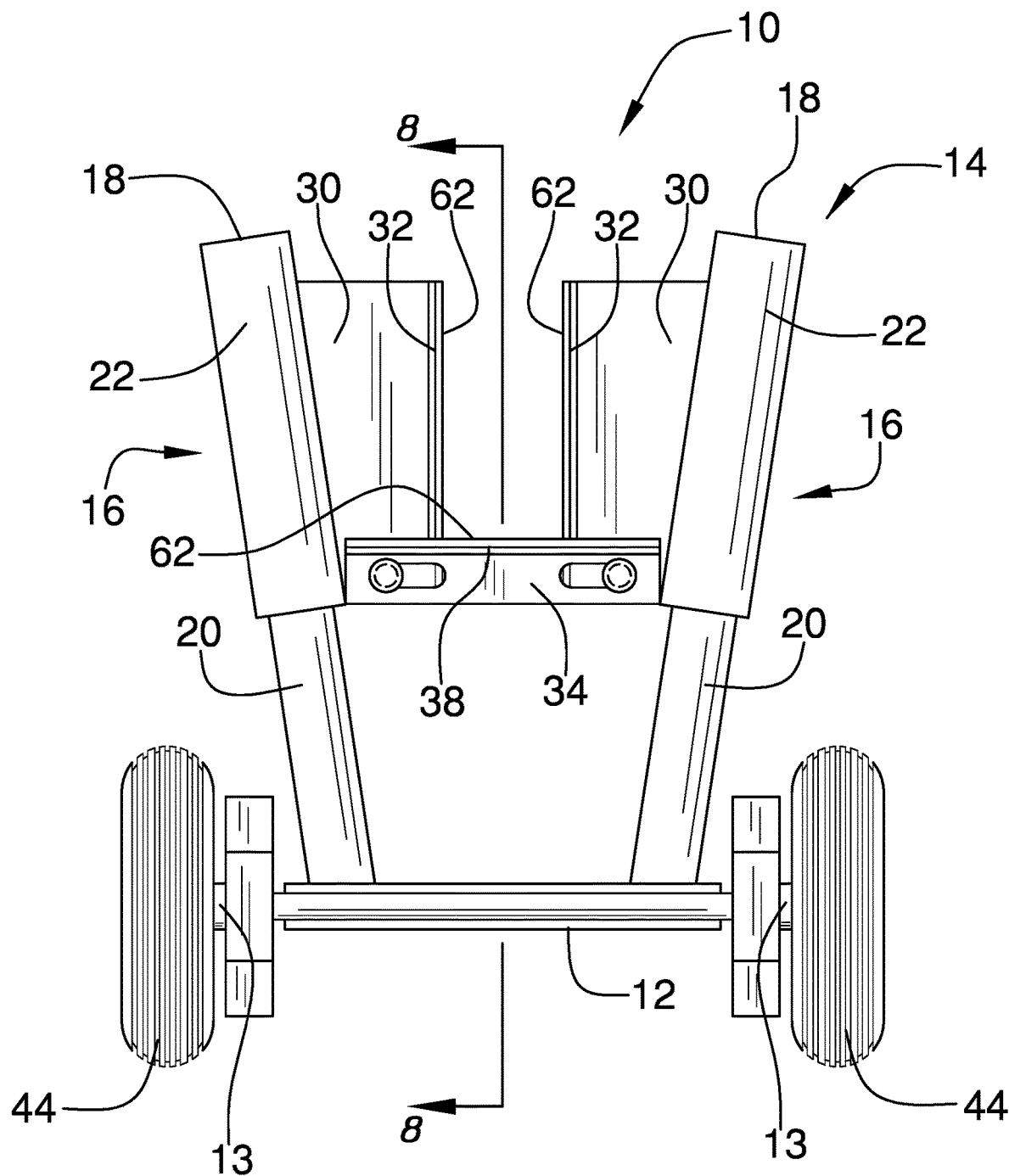
FIG. 2 is a front view of an embodiment of the disclosure.
Figure 3:
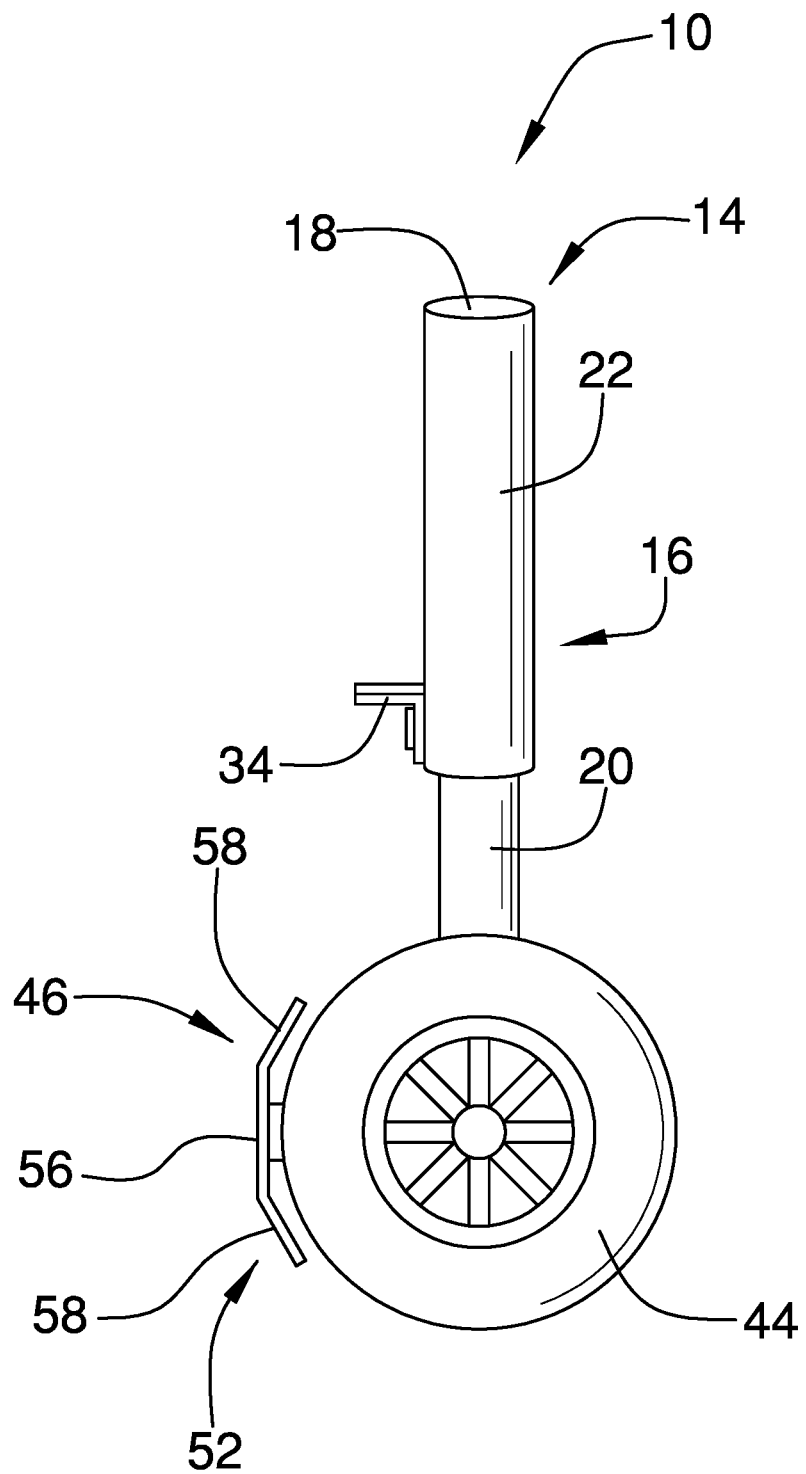
FIG. 3 is a side view of an embodiment of the disclosure.
Figure 4:
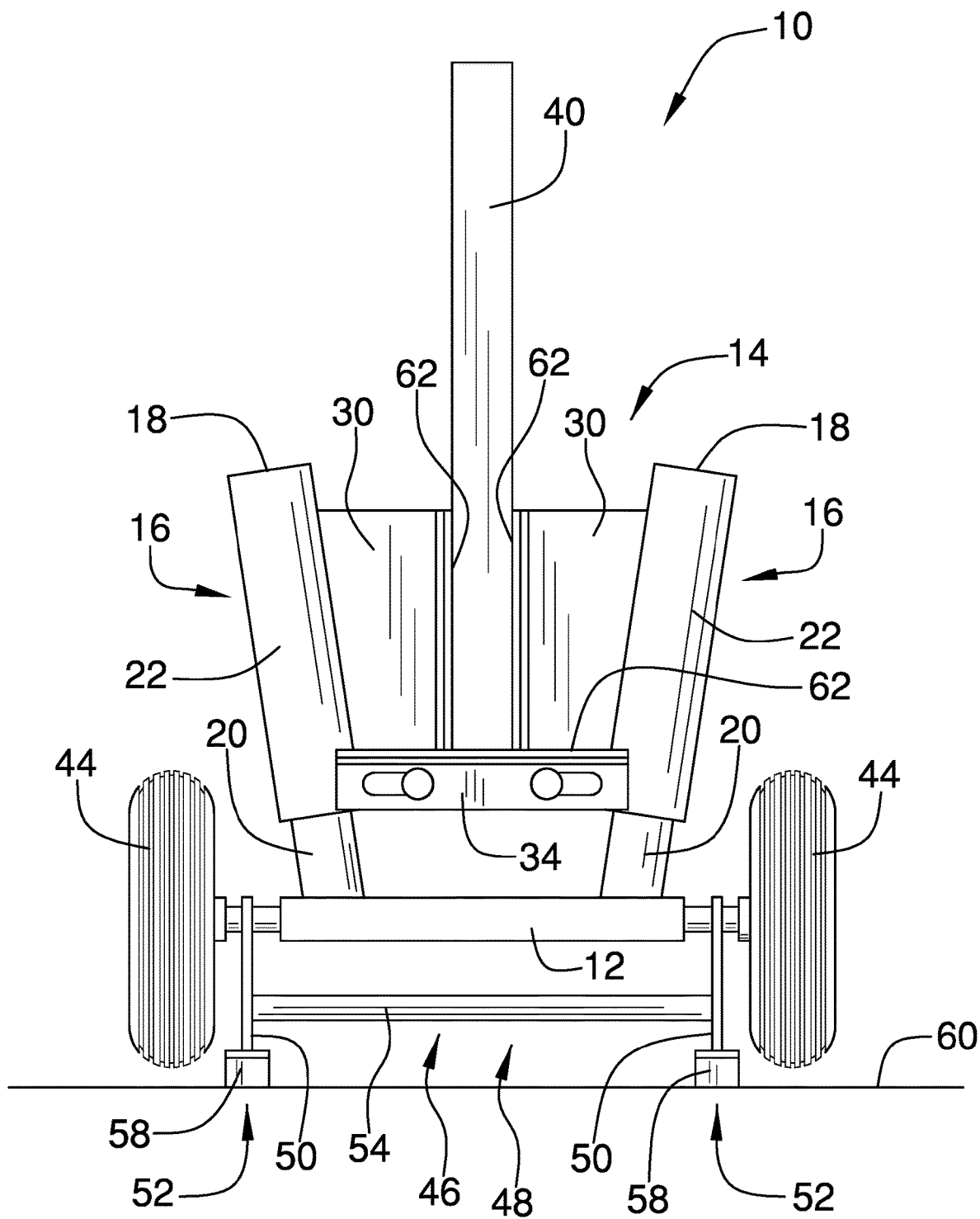
FIG. 4 is a front in-use view of an embodiment of the disclosure.
Figure 5:
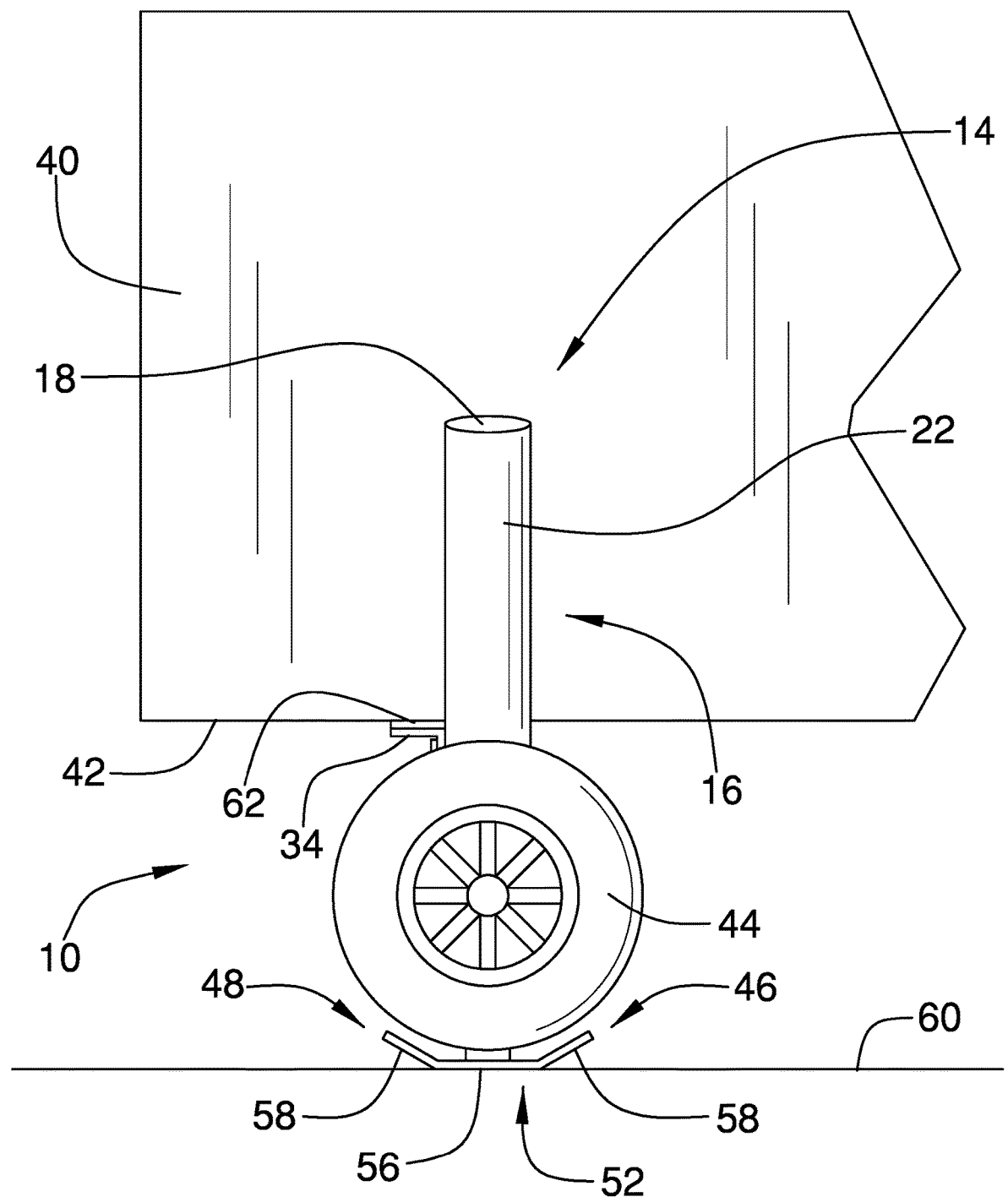
FIG. 5 is a side in-use view of an embodiment of the disclosure.
Figure 6:
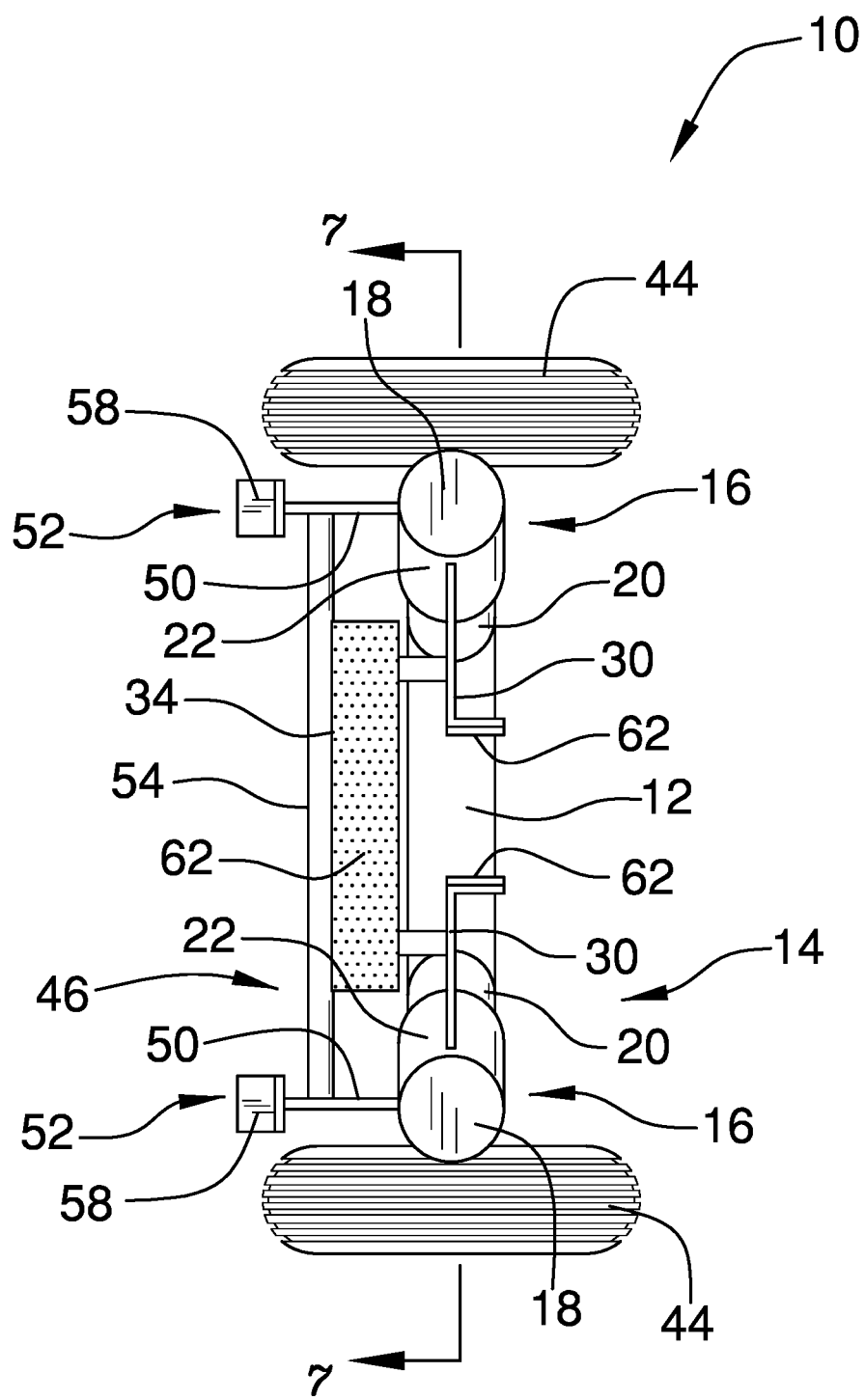
FIG. 6 is a top view of an embodiment of the disclosure.
Figure 7:
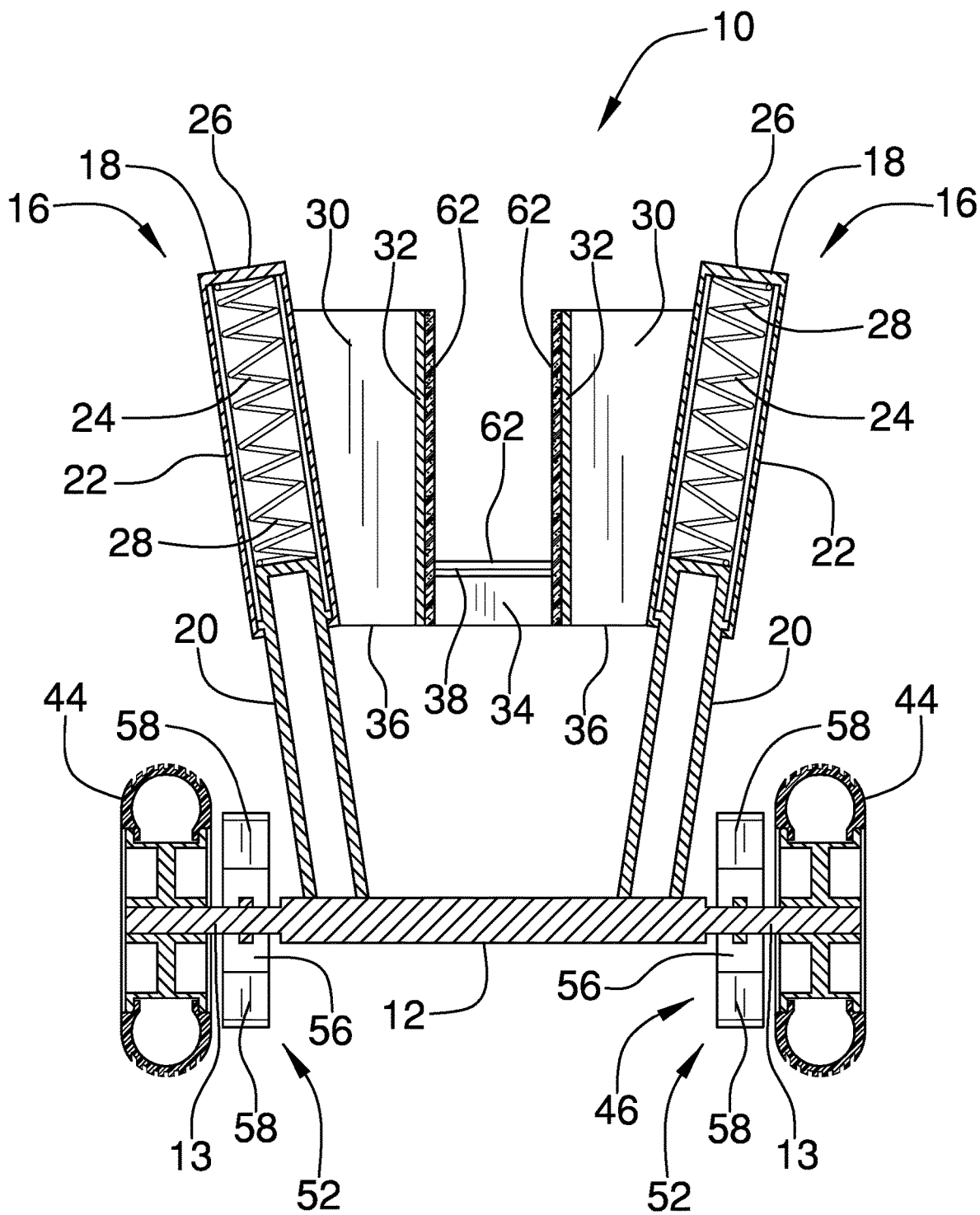
FIG. 7 is a cross-section view of an embodiment of the disclosure taken from Arrows 7-7 in FIG. 6.
Figure 8:
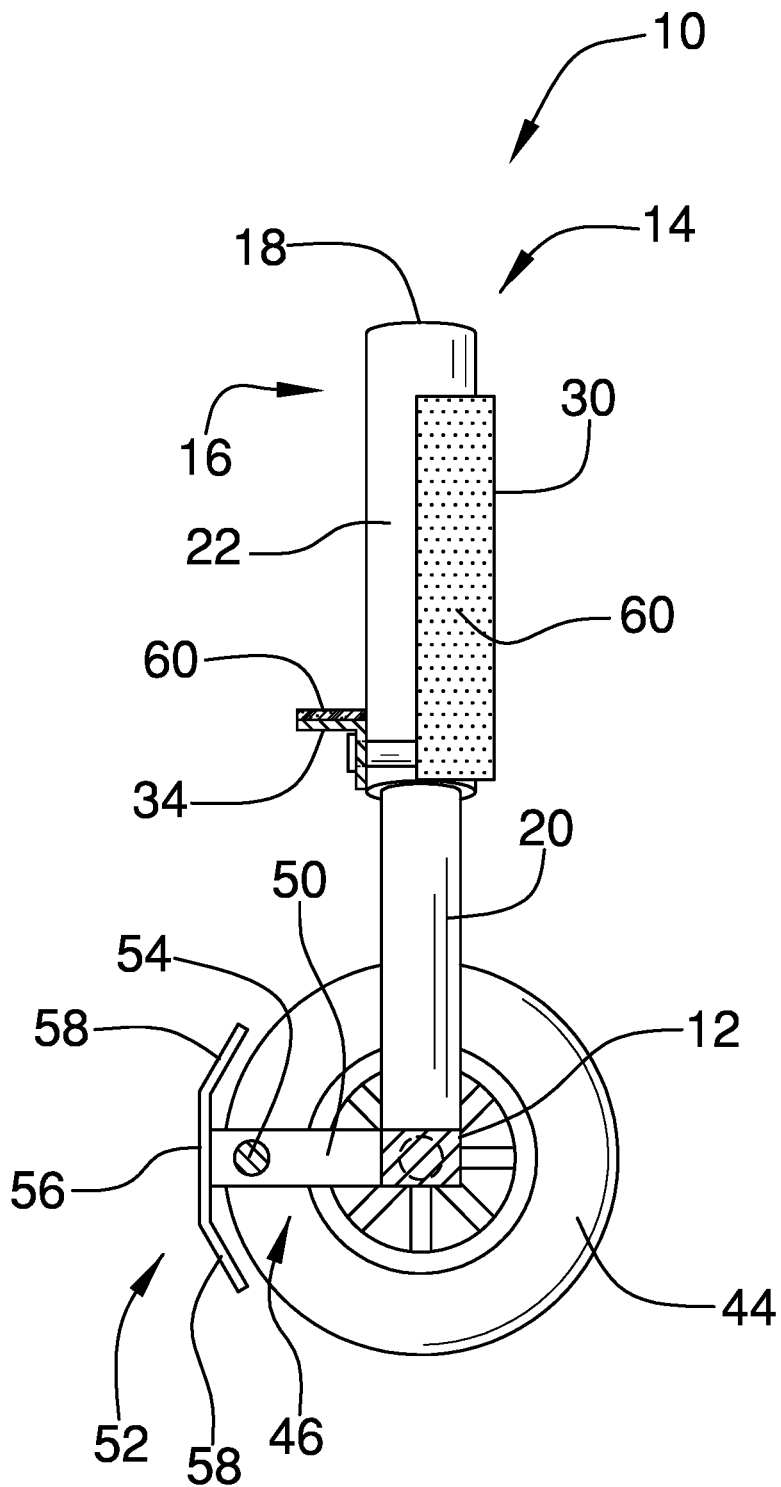
FIG. 8 is a cross-section view of an embodiment of the disclosure taken from Arrows 8-8 in FIG. 2.
Figure 9:
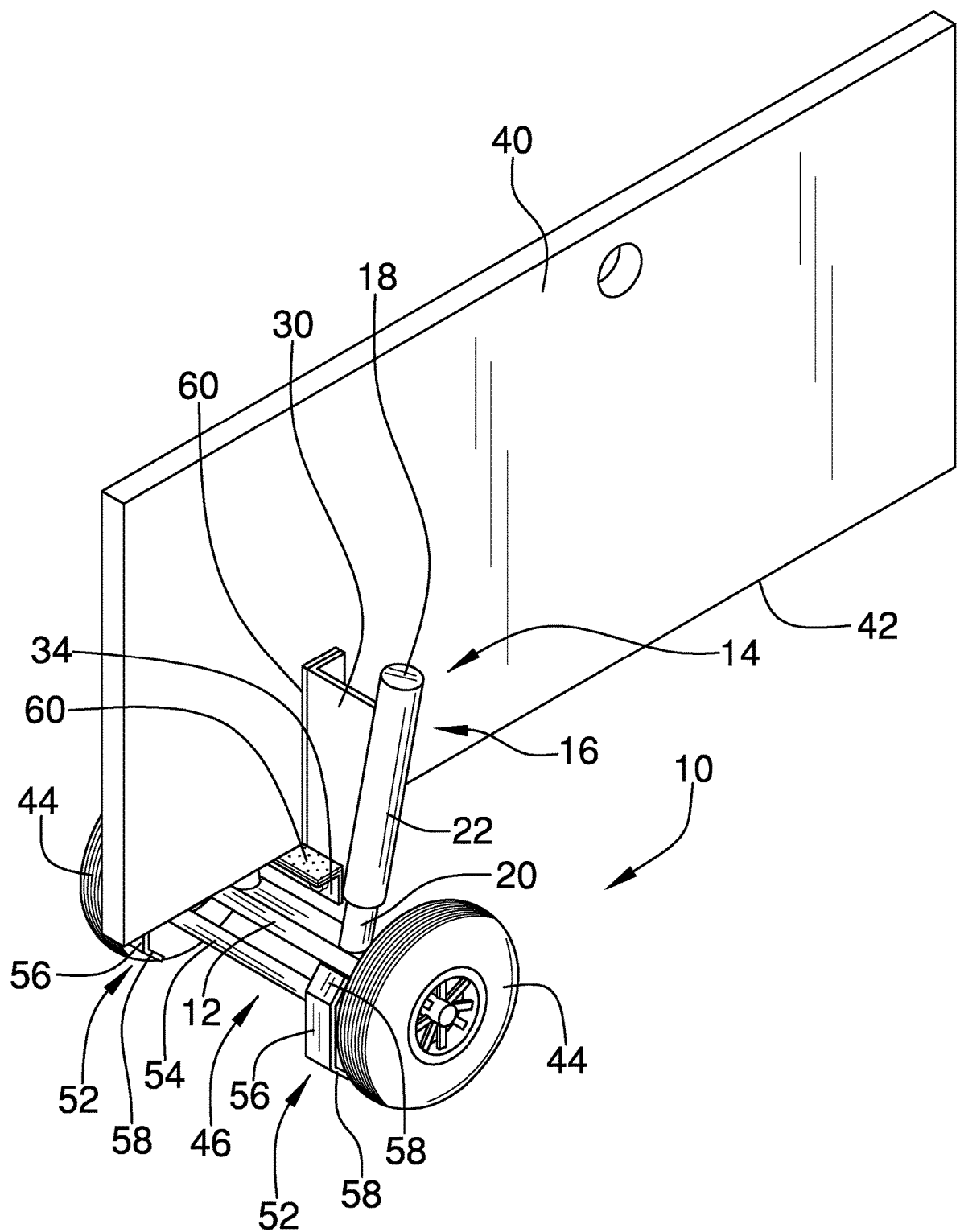
FIG. 9 is a perspective in-use view of an embodiment of the disclosure.

With reference now to the drawings, and in particular to FIGS. 1 through 9 thereof, a new door dolly embodying the principles and concepts of an embodiment of the disclosure and generally designated by the reference numeral 10 will be described.

As best illustrated in FIGS. 1 through 9, the dolly apparatus 10 generally comprises a base 12 and a clamping linkage 14 mounted on the base 12. The clamping linkage 14 comprises a pair of telescopic members 16, a pair of jaws 30, and an actuator 34. The pair of telescopic members 16 is mounted to and extends upwardly from the base 12. Each telescopic member 16 is alternately retractable downwardly and extendable upwardly from the base 12. The telescopic members 16 are oriented to diverge away from each other from the base 12 toward upper ends 18 of the telescopic members 16. Each telescopic member 16 of the pair of telescopic members 16 has a lower member 20 and an upper member 22 which are slidably coupled to each other. The lower member 20 is received into the upper member 22. Each telescopic member 16 of the pair of telescopic members 16 has a biasing member 24 engaging the upper member 22 and the lower member 20 to urge the upper member 22 to move upwardly from the lower member 20. The biasing member 24 is positioned in the upper member 22 between the lower member 20 and an upper wall 26 of the upper member 22. The biasing member 24 comprises a compression spring 28.

Each jaw 30 of the pair of jaws 30 is coupled to the upper member 22 of an associated one of the pair of telescopic members 16. Each jaw 30 of the pair of jaws 30 extends from the associated telescopic member 16 toward another jaw 30 of the pair of jaws 30 and has an engagement surface 32 facing the other jaw 30. The engagement surface 32 of each jaw 30 is oriented vertically and parallel to the engagement surface 32 of the other jaw 30. The actuator 34 is slidably coupled to each jaw 30 of the pair of jaws 30 and is movable downwardly to move the jaws 30 of the pair of jaws 30 downwardly and toward each other. More specifically, when the actuator 34 moves each one of the pair of jaws 30 downwardly, each jaw 30 is moved along the associated telescopic member 16 such each jaw 30 of said pair of jaws 30 moves downwardly and toward another of said pair of jaws 30. The actuator 34 is slidable with respect to each jaw 30 of said pair of jaws 30 such that said actuator 34 permits each jaw 30 of said pair of jaws 30 to move toward another jaw 30 of said pair of jaws 30.

The actuator 34 is positioned adjacent to a bottom end 36 of each jaw 30 of the pair of jaws 30. The actuator 34 has an upper surface 38 configured to support a door 40. The clamping linkage 14 is configured to clamp a door 40 between the pair of jaws 30 when a weight force is exerted by the door 40 on the upper surface 38 of the actuator 34.

A pair of wheels 44 each is rotatably mounted to the base 12. The wheels 44 of the pair of wheels 44 are positioned on opposite ends 13 of the base 12. A stand 46 is mounted to the base 12 and is positionable in a deployed condition 48 wherein the stand 46 extends downwardly from the base 12 past the pair of wheels 44. The stand 46 is configured for supporting the base 12 above a support surface 60 when positioned in the deployed condition 48. The stand 46 comprises a pair of arms 50, a pair of feet 52, and a crossbar 54. The pair of arms 50 is pivotally coupled to the base 12, and each arm 50 is positioned adjacent to an associated one of the pair of wheels 44. Each foot 52 of the pair of feet 52 is coupled to an associated arm 50 of the pair of arms 50 and is positioned distally from the base 12. The crossbar 54 is coupled to and extending between the pair of arms 50. Each foot 52 of the pair of feet 52 has a central member 56 and a pair of outer members 58, wherein the central member 56 is coupled to and extends between the pair of outer members 58. Each outer member 58 of the pair outer members 58 is angled toward the base 12 from the central member 56. The shape of each foot 52 of the pair of feet 52 facilitates moving each foot 52 against the support surface 60 without harshly striking the support surface 60 with an edge.

A plurality of liners 62 is coupled to the clamping linkage 14. Each liner 62 of the plurality of liners 62 is coupled to an associated one of the engagement surface 32 of each jaw 30 of the pair of jaws 30 and the upper surface 38 of the actuator 34. Each liner 62 of the plurality of liners 62 comprises a soft and nonabrasive material such that the liner 62 is configured to engage the door 40 without marring the door 40. The soft and nonabrasive material may be, for example, rubber, a polymer foam, silicone, nylon, or the like.

In use, the stand 46 is positioned in the deployed condition 48 to support the base 12 above the support surface 60. An edge 42 of the door 40 is positioned on the upper surface 38 of the actuator 34 to support the door 40 on the actuator 34 and cause the pair of jaws 30 to move toward each other and clamp the door 40. The stand 46 is moved out of the deployed condition 48 to put the pair of wheels 44 in engagement with the support surface 60, and the door 40 is transported across the support surface 60 facilitated by the pair of wheels 44. A user may grasp the door 40 at a position spaced from the pair of wheels 44 to inhibit rotation of the door 40 about the base 12. The dolly apparatus 10 may also be used to clamp and transport other generally planar objects such as tables, plywood sheets, and the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dolly apparatus for transporting a door, the apparatus comprising:

a base;

a clamping linkage being mounted on the base, the clamping linkage comprising a pair of jaws and an actuator, the actuator having an upper surface configured to support a door, the pair of jaws being operatively coupled to the actuator such that the pair of jaws move toward each other above the actuator when the actuator moves downwardly, the actuator being configured to move downwardly when a weight force is exerted by the door on the upper surface of the actuator, the clamping linkage being configured to clamp the door between the pair of jaws when the weight force is exerted by the door on the upper surface of the actuator, the clamping linkage including:

a pair of telescopic members being mounted to and extending upwardly from the base, each telescopic member being alternately retractable downwardly and extendable upwardly from the base, the pair of telescopic members being oriented to diverge away from each other from the base toward upper ends of the telescopic members, each telescopic member of the pair of telescopic members having a lower member and an upper member being slidably coupled to each other;

each jaw of the pair of jaws being coupled to the upper member of an associated one of the pair of telescopic members, each jaw of the pair of jaws extending from the associated telescopic member toward another jaw of the pair of jaws, each jaw of the pair of jaws having an engagement surface facing the other jaw; and the actuator being slidably coupled to each jaw of the pair of jaws, the actuator being movable downwardly to move the jaws of the pair of jaws downwardly and toward each other, the actuator being positioned adjacent to a bottom end of each jaw of the pair of jaws; and a pair of wheels each being rotatably mounted to the base, the wheels of the pair of wheels being positioned on opposite ends of the base.

2. The apparatus of claim 1, wherein the lower member is received into the upper member.

3. The apparatus of claim 2, wherein each telescopic member of the pair of telescopic members has a biasing member engaging the upper member and the lower member to urge the upper member to move upwardly from the lower member.

4. The apparatus of claim 3, wherein the biasing member is positioned in the upper member between the lower member and an upper wall of the upper member.

5. The apparatus of claim 4, wherein the biasing member comprises a compression spring.

6. The apparatus of claim 1, wherein the engagement surface of each jaw is oriented vertically and parallel to the engagement surface of the other jaw.

7. The apparatus of claim 1, further comprising a stand being mounted to the base, the stand being positionable in a deployed condition wherein the stand extends downwardly from the base past the pair of wheels, the stand being configured for supporting the base above a support surface when positioned in the deployed condition.

8. The apparatus of claim 7, wherein the stand comprises an arm being pivotally coupled to the base and a foot being coupled to the arm and being positioned distally from the base.

9. The apparatus of claim 8, wherein the foot has a central member and a pair of outer members, the central member being coupled to and extending between the pair of outer members, each outer member of the pair of outer members being angled toward the base away from the central member.

10. The apparatus of claim 7, wherein the stand comprises:
a pair of arms being pivotally coupled to the base, each arm being positioned adjacent to an associated one of the pair of wheels;
a pair of feet, each foot of the pair of feet being coupled to an associated arm of the pair of arms and being positioned distally from the base; and
a crossbar being coupled to and extending between the pair of arms.

11. The apparatus of claim 10, wherein each foot of the pair of feet has a central member and a pair of outer members, the central member being coupled to and extending between the pair of outer members, each outer member of the pair outer members being angled toward the base from the central member.

12. The apparatus of claim 1, further comprising a plurality of liners being coupled to the clamping linkage, each liner of the plurality of liners being coupled to an associated one of the engagement surface of each jaw of the pair of jaws and the upper surface of the actuator, each liner of the plurality of liners comprising a soft and nonabrasive material such that the liner is configured to engage the door without marring the door.

13. A dolly apparatus for transporting a door, the apparatus comprising:
a base;
a clamping linkage being mounted on the base, the clamping linkage comprising:
a pair of telescopic members being mounted to and extending upwardly from the base, each telescopic member being alternately retractable downwardly and extendable upwardly from the base, the pair of telescopic members being oriented to diverge away from each other from the base toward upper ends of the telescopic members, each telescopic member of the pair of telescopic members having a lower member and an upper member being slidably coupled to each other, the lower member being received into the upper member, each telescopic member of the pair of telescopic members having a biasing member engaging the upper member and the lower member to urge the upper member to move upwardly from the lower member, the biasing member being positioned in the upper member between the lower member and an upper wall of the upper member, the biasing member comprising a compression spring;
a pair of jaws, each jaw of the pair of jaws being coupled to the upper member of an associated one of the pair of telescopic members, each jaw of the pair of jaws extending from the associated telescopic member toward another jaw of the pair of jaws, each jaw of the pair of jaws having an engagement surface facing the other jaw, the engagement surface of each jaw being oriented vertically and parallel to the engagement surface of the other jaw; and
an actuator being slidably coupled to each jaw of the pair of jaws, the actuator being movable downwardly to move the jaws of the pair of jaws downwardly and toward each other, the actuator being positioned adjacent to a bottom end of each jaw of the pair of jaws, the actuator having an upper surface configured to support a door, the clamping linkage being configured to clamp the door between the pair of jaws when a weight force is exerted by the door on the upper surface of the actuator;
a pair of wheels each being rotatably mounted to the base, the wheels of the pair of wheels being positioned on opposite ends of the base;
a stand being mounted to the base, the stand being positionable in a deployed condition wherein the stand extends downwardly from the base past the pair of wheels, the stand being configured for supporting the base above a support surface when positioned in the deployed condition, the stand comprising:
a pair of arms being pivotally coupled to the base, each arm being positioned adjacent to an associated one of the pair of wheels;
a pair of feet, each foot of the pair of feet being coupled to an associated arm of the pair of arms and being positioned distally from the base, each foot of the pair of feet having a central member and a pair of outer members, the central member being coupled to and extending between the pair of outer members, each outer member of the pair outer members being angled toward the base from the central member; and
a crossbar being coupled to and extending between the pair of arms; and
a plurality of liners being coupled to the clamping linkage, each liner of the plurality of liners being coupled to an associated one of the engagement surface of each jaw of the pair of jaws and the upper surface of the actuator, each liner of the plurality of liners comprising a soft and nonabrasive material such that the liner is configured to engage the door without marring the door.

\* \* \* \* \*